Patented Oct. 27, 1931

1,829,705

UNITED STATES PATENT OFFICE

JOHN C. WALKER, OF ELDORADO, KANSAS, ASSIGNOR TO EMPIRE OIL & REFINING COMPANY, OF DOVER, DELAWARE, A CORPORATION OF DELAWARE

PREVENTION OF CORROSION IN OIL WELLS

No Drawing.   Application filed March 12, 1925.  Serial No. 14,938.

The present invention relates to the prevention of corrosion and scale in oil wells.

It is well known that the liquids in many oil-yielding wells attack the metal of the casings, pumps, etc., installed in the well, causing serious losses of material and time.

It is the principal object of the present invention to provide a process for preventing or avoiding the losses just mentioned.

An extensive investigation of the waters associated with oils has shown that the compounds which are mainly responsible for the corrosion of metal parts installed in oil wells are hydrogen sulphide, sulphuric acid, carbonic acid or other mineral acids associated with oxygen. All of these compounds are acidic in action and many of them are very active in destroying iron and steel parts.

The present invention contemplates the prevention of corrosion of metal parts in oil wells by overcoming the acidic nature of the brines or waters in the oil well. To accomplish this, compounds which have an alkaline reaction in water, are introduced into the well so as to come in contact with the brines or water in the well. These compounds neutralize the acidic compounds in the well water and prevent the attack of metals by the acid compounds in the water.

The invention also contemplates the prevention of scale in the wells by holding any precipitated matter which normally forms the scale in such a form that it will be carried out of the well with the water and oil pumped from the well.

When the underground waters contain hydrogen sulphide, iron sulphide is formed which adheres as a scale especially in the presence of oils. When hydrogen sulphide acts on iron, ferrous sulphide is formed. Ferrous sulphide, thus formed, tends to cling to the metal especially in spots where there is an impurity in the iron or steel and more especially in the presence of a film of oil which apparently is rather strongly absorbed on the ferrous sulphide. The presence of iron sulphide in contact with the iron sets up an electric couple when immersed in salt water or other electrolyte, as in the water of the well. The current set up by this couple passes from the iron sulphide to the iron at their points of contact, from the iron to the electrolyte (salt water and hydrogen sulphide) and back to the iron sulphide completing the circuit. Corrosion has been shown by experiment to be many times more rapid in the presence of iron sulphide in contact with iron due to this action. The removal of this iron sulphide from the iron if formed or as formed will in itself greatly reduce the speed of corrosion. The chemicals used in this process have the property of removing the iron sulphide deposits from the iron and dispersing this material in the form of a suspension in the fluid in the well. The iron sulphide is therefore removed with the fluids pumped from the wells. When a well which gives trouble due to corrosion and the metal parts of which are coated with iron sulphide scale is treated by the present process for the first time, the water pumped from the well after treatment is usually black with suspended iron sulphide which is so finely divided as to be practically in colloidal suspension. This pumping of black water may continue for days under this treatment, but the water will lose color gradually as the scale of iron sulphide is removed. If the tubing is pulled after such treatment and after the water has become clear again it will be found that the tubing is clear of soft scale and oily-ferrous sulphide accumulations and that the corrosive action has been arrested. The use of reagents such as cresylic acid is necessary according to the present invention to remove the film of oil mixed with ferrous sulphide, to keep the metal clean and thus to stop electrolytic action. If the water in the well comes in contact with carbonic acid or oxygen, or contains either one and comes in contact with the other, or contains both carbonic acid and oxygen, iron oxide (hydrated) is found which also appears on the iron of the well as scale (trust). A further source of troublesome scale is strontium chloride, or other soluble strontium salt, which is contained in the top waters in many localities. Strontium containing top waters upon admixture with bottom water containing sodium or calcium sulphate in solution results in strontium sulphate. The strontium sulphate is formed slowly, due to the high concentration of chloride ions and deposits as a very hard compact scale. While strontium sulphate does not affect the corrosion to any great extent, it causes serious mechanical troubles. These scales promote the corrosion of the metal parts and greatly interfere with the proper operation of the pumping apparatus which may be installed at the bottom of the well. Caustic soda is a very strong neutralizing agent for the acidic compounds of oil well brines, but it has the disadvantage that it reacts quickly with calcium and magnesium salts contained in the brines and thereby the neutralizing strength of the caustic is rapidly depleted and calcium and magnesium salts are often precipitated. Accordingly, if sodium hydroxide is used alone as a neutralizing agent an undesirably large amount of caustic soda must be used to accomplish the results, and undesirable precipitates are formed in the well to add to the difficulties of forming scale.

Sodium cresylate has been found to be very effective for treating the oil well brines to reduce their acidity and to prevent the formation of scale. The sodium cresylate is very effective in preventing corrosion and gives a sufficiently alkaline or caustic reaction in the water to neutralize the acidic substances in the oil well water or brines. The sodium cresylate also has the additional advantage that it reacts slowly with the calcium and magnesium salts in the well liquids, thus allowing rapid diffusion of the neutralizing solution throughout the water in the oil well. A sodium cresylate solution, moreover, has sufficiently active neutralizing reaction to hold down the acidic properties of the oil well brines such that any oxygen which may be present in the well will not be active, due to the fact that oxygen is much more active in acidic solutions than in a neutral solution.

Furthermore, a sodium cresylate tends to keep the metal surfaces clean, which materially aids in pumping in that the piston and packing will effectively operate in the working barrel and the friction losses will be held at a minimum. This then aids in lessening the amount of power which is used in pumping and in lessening the strain on the pumping rods and associated parts. When the acid of oil well brines comes into contact with sodium cresylate, sodium sulphide or hydrosulphide is formed and cresylic acid is set free. This cresylic acid is very effective in keeping the tubing and pumping parts clean and free of oil films. A further advantage of sodium cresylate according to the present invention is that although some precipitate is formed when the cresylate is used, as is the case when using other caustic neutralizing agents, the precipitate formed by sodium cresylate is adsorbed to some extent on the oil in the well and the precipitate is therefore removed by the pump so that little if any of it collects in the well.

The treating solution for preventing the corrosion of metal parts in an oil well is preferably made by mixing a solution of caustic soda with cresylic acid. A pure cresylic acid is not necessary for making the treating solution, but in fact it is preferred to use a crude coal tar cresylic acid distillate. The crude coal tar distillates appear to give better results than the chemically pure products, and in the place of cresylic acid very good results have been obtained when using phenols and its derivatives and substitution products, and the naphthenes. It has also been found that the acid distillates obtained from low temperature tar distillation which contain hydrogenated phenol compounds or dehydrogenated naphthene compounds may be used to good advantage in the place of cresylic acid distillate. All of these compounds are cyclic hydroxy compounds in which an OH group is connected directly to one of the carbon atoms of the benzene ring.

Other caustic or alkaline reacting salts or compounds suitable also for use according to the present invention are sodium sulfite, sodium sulfide, calcium sulfide, calcium hydroxide, and the like. Potassium dichromate or sodium dichromate, chromous or chromic acid will in many cases be very useful either alone or in alkaline (caustic) solution. When used with the caustic solution these reagents, of course, will exist as the chromates only, the dichromates and free acid being converted to chromates by the caustic solution. The chromates or chromate type of reagent is preferred when the corrosion is due to the presence of oxygen and carbon dioxide in the water. The use of this reagent in the presence of hydrogen sulphide or the sulphide type of corrosion is not desirable, due to the oxidation of the hydrogen sulphide by this type of reagent. In special cases where the corrosion is of the oxidation type and there is no free acid present, a dichromate, chromate, chromous acid or chromic acid may be employed alone to advantage because such or similar reagents render the iron passive. Such treatment is particularly advantageous when the water to be treated is high in bicarbonates of calcium or magnesium, in which case the presence of large amounts of caustic soda or sodium cresylate might cause excessive precipitation of calcium or magnesium carbonates.

When treating the liquids in the well according to the present invention, it has been found that it is necessary for best results and for protection of all the metal parts of or in the well that the neutralizing compound diffuse rapidly through the liquids in the well. This result is accomplished according to the present invention by adding the neutralizing agent to a brine or salt water which has a specific gravity substantially the same as the specific gravity of the water in the well to be treated. In making up a reagent solution, the desired specific gravity for the purposes herein described is obtained either by adding a salt, such as sodium chloride, which is stable under the conditions in the well or by using water from the well to be treated. In the latter case, a calculated excess of caustic is added to compensate for the calcium salts precipitated by the caustic and/or other neutralizing compound used.

The chemical or neutralizing agent may be added to the well in various ways. One satisfactory schedule of operation is to introduce ninety per cent or more of the reagent solution between the casing and the pump delivery pipe as rapidly as possible just after the pump is shut down. The remainder of the reagent is added in the same way, but about fifteen minutes before the well is pumped off. However, when the well pumps continuously and water is continuously brought into and removed from the well by the pump, it is necessary to add the chemical to the well continuously and in properly proportioned amounts.

Having thus described my invention, I claim:

1. A method of preventing corrosion from oil well liquids comprising treating the well liquids with an alkali salt of a monohydroxy phenolic compound.

2. The method of preventing corrosion from oil well liquids comprising treating the well liquids with the alkali salt of a compound containing a single —OH group connected directly to a benzene ring.

3. A method of preventing corrosion from oil well liquids comprising neutralizing the acid components of the well liquids and inhibiting electrolytic corrosive action with sodium cresylate.

4. A method of preventing corrosion from oil well liquids comprising mixing with the well liquids a water solution of an alkali salt of a cresol-like substance, said solution having a specific gravity substantially equal to that of the well water.

5. A method of preventing corrosion from oil well liquids comprising mixing with the well liquids a water solution containing sodium cresylate and having substantially the same specific gravity as the well water.

6. A method of preventing corrosion of metal parts in contact with liquids from oil wells comprising mixing with said liquids, a water solution of an alkali salt of a substance having an —OH group attached directly to a carbon atom of a benzene ring and having a specific gravity substantially equal to that of the water in the well.

In testimony whereof I affix my signature.

JOHN C. WALKER.